United States Patent
Nakayama (10) Patent No.: US 9,817,217 B2
(45) Date of Patent: Nov. 14, 2017

(54) IMAGING OPTICAL SYSTEM, CAMERA DEVICE, AND PORTABLE INFORMATION TERMINAL APPARATUS

(71) Applicant: Takahiro Nakayama, Kanagawa (JP)

(72) Inventor: Takahiro Nakayama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/195,051

(22) Filed: Jun. 28, 2016

(65) Prior Publication Data
US 2017/0023777 A1    Jan. 26, 2017

(30) Foreign Application Priority Data
Jul. 24, 2015   (JP) ................................ 2015-146757

(51) Int. Cl.
| | |
|---|---|
| G02B 13/04 | (2006.01) |
| G02B 13/18 | (2006.01) |
| G02B 9/34 | (2006.01) |
| G02B 9/60 | (2006.01) |
| G02B 13/00 | (2006.01) |

(52) U.S. Cl.
CPC .............. *G02B 13/04* (2013.01); *G02B 9/34* (2013.01); *G02B 9/60* (2013.01); *G02B 13/004* (2013.01); *G02B 13/006* (2013.01); *G02B 13/0045* (2013.01)

(58) Field of Classification Search
CPC ............................. G02B 13/0035; G02B 9/12
USPC ........................................ 359/716, 753, 784
See application file for complete search history.

(56) References Cited

U.S. PATENT DOCUMENTS

| | | | |
|---|---|---|---|
| 5,218,476 A | * | 6/1993 | Ito .................. G02B 15/167 359/676 |
| 2006/0104677 A1 | | 5/2006 | Saito et al. |
| 2007/0059071 A1 | | 3/2007 | Shinshi et al. |
| 2007/0110464 A1 | | 5/2007 | Nakayama et al. |
| 2008/0112734 A1 | | 5/2008 | Furuya et al. |
| 2008/0118281 A1 | | 5/2008 | Saeki et al. |
| 2008/0187343 A1 | | 8/2008 | Yamaguchi et al. |
| 2010/0027254 A1 | | 2/2010 | Nakayama |
| 2010/0296180 A1 | | 11/2010 | Sudoh et al. |
| 2011/0051260 A1 | | 3/2011 | Nakayama et al. |
| 2011/0141578 A1 | | 6/2011 | Nakayama |
| 2011/0150540 A1 | | 6/2011 | Saeki et al. |

(Continued)

FOREIGN PATENT DOCUMENTS

| | | |
|---|---|---|
| JP | 2003-131126 | 5/2003 |
| JP | 2014-016574 | 1/2014 |

(Continued)

*Primary Examiner* — William Choi
(74) *Attorney, Agent, or Firm* — Oblon, McClelland, Maier & Neustadt, L.L.P.

(57) ABSTRACT

An imaging optical system includes, in order from the object side, a first lens group, an aperture stop, and a second lens group. The first lens group includes, in order from the object side, a negative lens of a biconcave shape and a positive meniscus lens with a convex surface facing the object side. The second lens group includes, in order from the object side, a second-front lens group and a second-rear lens group, the second-rear lens group having a positive refractive power as a whole. The second-front lens group includes a cemented lens formed by combing a negative lens with a concave surface facing the object side and a positive lens.

11 Claims, 8 Drawing Sheets

(56) References Cited

U.S. PATENT DOCUMENTS

| | | | |
|---|---|---|---|
| 2013/0155511 A1* | 6/2013 | Peng | G02B 13/18 |
| | | | 359/557 |
| 2013/0215321 A1 | 8/2013 | Nakayama | |
| 2014/0184845 A1 | 7/2014 | Nakayama | |
| 2015/0226936 A1 | 8/2015 | Suzuki et al. | |
| 2015/0253544 A1 | 9/2015 | Nakayama | |
| 2015/0253548 A1 | 9/2015 | Nakayama | |

FOREIGN PATENT DOCUMENTS

| | | |
|---|---|---|
| JP | 2014-160104 | 9/2014 |
| WO | WO2012/086199 A1 | 6/2012 |

* cited by examiner

IMAGING OPTICAL SYSTEM, CAMERA DEVICE, AND PORTABLE INFORMATION TERMINAL APPARATUS

CROSS-REFERENCE TO RELATED APPLICATIONS

This patent application is based on and claims priority pursuant to 35 U.S.C. §119(a) to Japanese Patent Application No. 2015-146757, filed on Jul. 24, 2015 in the Japan Patent Office, the entire disclosure of which is hereby incorporated by reference herein.

BACKGROUND

Technical Field

Exemplary aspects of the present disclosure generally relate to an imaging optical system, a camera device including the imaging optical system, the portable information terminal apparatus including the imaging optical system.

Related Art

In recent years, there is a need for a camera device and an optical sensor to have a wide variety of optical capabilities, and the demand for a compact single-focus lens to have a small F number, a wide angle of view, and a high performance is increasing.

The single-focus lens includes a retro-focus lens as a representative example of the single-focus lenses. Many technologies of imaging optical systems are disclosed.

SUMMARY

In an aspect of this disclosure, there is provided an improved imaging optical system including, in order from an object side, a first lens group, an aperture stop, and a second lens group. The first lens group includes, in order from the object side, a negative lens of a biconcave shape and a positive meniscus lens with a convex surface facing the object side. The second lens group includes, in order from the object side, a second-front lens group and a second-rear lens group, the second-rear lens group having a positive refractive power as a whole. The second-front lens group includes a cemented lens formed by combining a negative lens with a concave surface facing the object side and a positive lens.

In another aspect of this disclosure, there is provided an improved camera device including the imaging optical system described above.

Further described are improved portable information terminal apparatus including the imaging optical system described above.

BRIEF DESCRIPTION OF THE DRAWINGS

The aforementioned and other aspects, features, and advantages of the present disclosure will be better understood by reference to the following detailed description when considered in connection with the accompanying drawings, wherein.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that have the same function, operate in a similar manner, and achieve similar results.

Although the embodiments are described with technical limitations with reference to the attached drawings, such description is not intended to limit the scope of the disclosure and all of the components or elements described in the embodiments of this disclosure are not necessarily indispensable.

Referring to the drawings, a description is provided of an imaging optical system 1' according to an embodiment of the present disclosure.

The imaging optical system 1' according to the present embodiment belongs to a retro-focus lens. In general, increasing the angle of view causes aberration, such as coma aberration, astigmatism, field curvature, and particularly distortion, to easily occur. Further, increasing the diameter of lens increases coma aberration and particularly spherical aberration, thereby increasing the length of an imaging optical system to correct aberrations. It is to be noted that among the aberration described above, only distortion does not influence the sharpness of a point image. Various configurations are established to electronically correct distortion on data passed through the image sensor. In view of the spec, such as size and performance of the imaging optical system, widely permitting distortion optimizes the overall balance in the imaging optical system.

The present inventor has found that the following configurations according to the present embodiments achieve a compact imaging optical system having a high performance with aberrations properly corrected and having a small F number with a wide angle of view.

The imaging optical system 1' according to the present embodiments includes a first lens group 1G, an aperture stop S, and a second lens group 2G in this order from the object side, as illustrated in FIGS. 1 through 5.

The first lens group 1G includes a negative biconcave lens L11 and a positive meniscus lens L12 with a convex surface facing the object side.

The second lens group 2G includes, in the order from the object side, a second-front lens group (hereinafter, referred to as "a second F lens group") 2FG and a second-rear lens group (hereinafter, referred to as "a second R lens group") 2RG. The second F lens 2FG includes a cemented lens formed by combining a negative lens L21 with a concave surface facing the object side and a positive lens L22. The second R lens group 2RG includes a positive lens L23 in FIGS. 1 through 3 and 5, and includes positive lenses L23 and L24 in FIG. 4. The second R lens group 2RG has a positive refractive power as a whole.

First, the imaging optical system 1' according to the present embodiment is a retro-focus lens, in which a negative group (the first lens group 1G) is disposed in the front (on the object side), and a positive group (the second lens group 2G) in the rear, considering a solid-state image sensor. Such configuration of the imaging optical system 1' according to the present embodiment reduces an angle, at which off-axis light enters the image surface, which is likely to increase with an increase in angle of view. In addition to the configuration described above, the negative lens L11 has a concave surface facing the image side and the positive lens L12 is of a meniscus shape with a convex surface facing the object side within the first lens group 1G. With such configuration, spherical aberration, which increases with an increase in diameter of lens, is effectively corrected.

Further, with the negative lens L11 having a concave surface facing the object side within the first lens group 1G, adjustment of distortion is effectively facilitated. The negative lens L11 having a biconcave shape easily increases a negative refractive power, which facilitates adopting a low-dispersion glass having a relatively low refractive index. As a result, the difficulty in adjustment of chromatic aberration. In the second F lens group 2FG disposed immediately behind the aperture stop S, the leading lens, i.e., the lens L21, has a concave surface on the object side. With such a configuration, the object-side surface of the lens L21 faces the image-side surface of the negative lens L11 within the first lens group 1G, thereby effectively correcting coma aberration. In addition, within the second F lens group 2FG, the negative lens L21 with a concave surface facing the object side and the positive lens L22 are disposed in this order. This arrangement facilitates adjustment of the Petzval sum. Further, combining the negative lens L21 and the positive lens L22 prevents a deterioration in performance due to manufacturing error.

In the imaging optical system 1' according to the present embodiment, the configuration as described above achieves a reduction in size, a wide angle of view with a full angle of view of approximately 69°, a large diameter with an F number of less than or equal to approximately 1.6, and a high performance. The imaging optical system according to the present embodiment of this disclosure may be used in a camera device, such as a vehicle-mounted camera, a vehicle-mounted stereo camera, a vehicle-mounted sensing camera, a digital camera, and video camera as well as a portable information terminal apparatus.

A description is provided of the imaging optical system 1' according to more preferable embodiments of the present disclosure.

The imaging optical system 1' according to the present embodiment preferably includes the positive lens L22 of a biconvex shape within the second F lens group 2FG to have more successful performance. With the positive lens L22 having a biconvex shape in the cemented lens, the negative lens L21 has a biconcave shape as well. Such configuration provides a relatively strong refractive power to both the negative lens L21 and the positive lens L22, thereby facilitating adjustment of the Petzval sum.

In the imaging optical system 1' according to the present embodiment, when the focal length of the entire system is f and the focal length of the second F lens group 2FG is f2F, conditional formula (1) below is preferably satisfied to provide better performance:

$$3.00 < |f2F/f| < 30.00. \tag{1}$$

Conditional formula (1) defines the optimal range of the ratio of the focal length f2F of the second F lens group 2FG relative to the focal length f of the entire system. With the value of |f2F/f| exceeding the upper limit value defined by conditional formula (1), the correction performance of spherical aberration within the first lens group 1G reduces or the sensitivity of manufacturing error increases. Alternatively, the diameter of the second R lens group 2RG increases, thereby increasing the size of the entirety of the imaging optical system 1'. With the value of |f2F/f| below the lower limit value defined by conditional formula (1), the aberration correction between the first lens group 1G and the second F lens group 2FG increases excessively, which may increase the sensitivity of manufacturing error.

It is to be noted that conditional formula (1A) below is preferably satisfied to provide better performance:

$$3.50 < |f2F/f| < 25.00. \tag{1A}$$

In the imaging optical system 1' according to the present embodiment, when the focal length of the negative lens L21 disposed on the most-object side within the second F lens group 2FG is f2F1, conditional formula (2) below is preferably satisfied to provide better performance:

$$0.30 < |f2F1/f| < 2.00. \tag{2}$$

Conditional formula (2) defines the optimal range of the ratio of the focal length f2F1 of the negative lens L21 disposed on the most-object side within the second F lens group 2FG relative to the focal length f of the entire system. With the value of |f2F1/f| exceeding the upper limit value defined by conditional formula (2), the correction performance of chromatic aberration shared by the negative lens L21 and the positive lens L22 within the second F lens group 2FG reduces, thereby increasing the difficulty in aberration correction, thus failing to obtain the desired performance. With the value of $|f2F1/f|$ below the lower limit value defined by conditional formula (2), an excessive amount of aberration correction occurs within the cemented lens, which may increase the sensitivity of manufacturing error. Further, there is a need for the positive lens L22 of the cemented lens to be made of super-high refractive index glass, thereby increasing costs.

To provide better performance, conditional formula (2A) below is preferably satisfied:

$$0.40<|f2F1/f|<1.50. \tag{2A}$$

In the imaging optical system 1' according to the present embodiment, when the focal length of the second lens group 2G is f2, conditional formula (3) below is preferably satisfied to provide better performance:

$$0.50<f2/f<4.00. \tag{3}$$

Conditional formula (3) defines the optimal range of the ratio of the focal length f2 of the second lens group 2G relative to the focal length f of the entire system. With the value of f2/f exceeding the upper limit value defined by conditional formula (3), the positive refractive power of the first lens group 1G increases, which may reduce the correction performance of spherical aberration within the first lens group 1G, or which may increase the sensitivity of manufacturing error. With the value of f2/f below the lower limit value defined by conditional formula (3), the positive refractive power of the first lens group 1G reduces, thereby increasing the height of the off-axis rays, which increases the diameters of the lenses within the second lens group 2G. As a result, the entirety of the imaging optical system 1' increases in size. Further, the correction of particularly spherical aberration between the first lens group 1G and the second lens group 2G increases, thereby increasing the sensitivity of manufacturing error.

To provide better performance, conditional formula (3A) below is preferably satisfied:

$$0.70<f2/f<3.00. \tag{3A}$$

In the imaging optical system 1' according to the present embodiment, when the distance (air space) along the optical axis from the last lens surface (the surface of the L12) of the first lens group 1G to the leading lens surface (the surface of the lens L21) is T12, conditional formula (4) below is preferably satisfied to provide better performance:

$$0.10<T12/f<1.00. \tag{4}$$

Conditional formula (4) defines the optimal range of the ratio of the distance (air space T12) in the vicinity of the aperture stop S relative to the focal length f of the entire system. With the value of T12/f exceeding the upper limit value defined by conditional formula (4), the height of the off-axis rays passing through the second lens group 2G increases, thereby increasing the diameters of lenses in the second lens group 2G, which increases the difficulty in correction of off-axis aberrations while leading to an increase in size of the entirety of imaging optical system. With the value of T12/f below the lower limit value defined by conditional formula (4), the height of the off-axis rays passing through the first lens group 1G decreases excessively, and thereby the light rays for the respective image heights fail to diverge, which may increase the difficulty in correction of the off-axis aberrations, particularly distortion.

To provide better performance, conditional formula (4A) below is preferably satisfied:

$$0.15<T12/f<0.80. \tag{4A}$$

In the imaging optical system 1' focused on the object at infinity according to the present embodiments, when the distance (the total optical length) along the optical axis from the first surface 1 of the first lens group 1G to the image surface is AL, conditional formula (5) below is preferably satisfied to provide better performance:

$$0.15<f/AL<0.50. \tag{5}$$

Conditional formula (5) defines the optimal range of the ratio of the total optical length AL relative to the focal length f of the entire system. In the case of reducing the angle of light entering the image sensor I, with the value of f/AL exceeding the upper limit value defined by conditional formula (5), the imaging optical system 1' come close to a front-stop system, thereby increasing the difficulty in correction of particularly distortion, resulting in failing to a desired imaging performance. With the value of f/AL below the upper limit value defined by conditional formula (5), which is advantageous from the viewpoint of correcting aberrations, the total length of the imaging optical system 1' increases, thus failing to achieve a compact optical system.

It is to be noted that with the use of a lens made of glass having a smaller thermal expansion coefficient and smaller fluctuations in optical characteristics due to changes in environment than optical resin material does, an imaging optical system that is highly tolerant against changes in environment and changes over time is achieved.

Regarding electronic correction of distortion, when the method of such a correction and deterioration in image are considered, it is preferable that distortion generated in the imaging optical system does not have an inflection point with respect to the image height, and that the value of distortion is less than approximately −20% at maximum.

The camera device according to the present embodiments includes the imaging optical system described above. Utilizing such imaging optical system achieves a compact and high-performance portable camera device having a wide angle of view with a full angle of view of approximately 69° and a large diameter with an F number of less than or equal to approximately 1.6. The camera device according to the present embodiments is suitably used particularly as a vehicle-mounted camera, a vehicle-mounted stereo camera, a vehicle-mounted sensing camera, a digital camera, and a video camera, though not limited to these uses. Preferably, the camera device according to the present embodiments converts a photographed image into digital image data suitable for image analysis and image processing.

The portable information terminal apparatus according to the present embodiment of this disclosure includes the imaging optical system as described above. Utilizing such imaging optical system achieves a compact and high-performance portable information terminal apparatus having a wide angle of view with a full angle of view of approximately 69° and a large diameter with an F number of less than or equal to approximately 1.6. Preferably, the portable information terminal apparatus converts a photographed image into digital image data. More suitable portable information terminal apparatus for image analysis and image processing is achieved.

Referring to the drawings, a description is provided of specific Examples of the present disclosure. FIG. 1 through FIG. 5 are illustrations of an optical arrangement of the imaging optical system according to Examples 1 through 5 of the present disclosure. In the Examples of FIGS. 1 through 5, with the right side of the drawing sheet as the image side, the lenses are arranged from the left side of the drawing sheet as the object side toward the image side.

The imaging optical system according to Examples 1 through 5 as illustrated in FIGS. 1 through 5 includes a first lens group 1G including a biconcave negative lens (biconcave lens) L11 and a positive meniscus lens L12 with a convex surface facing the object side, an aperture stop S, and a second lens group 2G including a second-F group 2FG, which is a cemented lens formed by combining a negative lens (biconcave lens) L21 with a concave surface facing the object side and a positive lens (biconvex lens) L22, and a second R-lens group 2RG.

In the imaging optical system according to Examples 1 through 3, and 5 as illustrated in FIGS. 1 through 3 and 5, the second R-lens group 2RG includes a positive lens (biconvex lens) L23. In the imaging optical system according to Example 4 as illustrated in FIG. 4, the second R-lens group 2RG includes two positive lenses of a biconvex lens L23 and a positive meniscus lens L24 with a convex surface facing the object side.

The symbol "T12" in FIGS. 1 through 5 denotes the distance (air space) along the optical axis from the last lens surface, i.e., the surface of the lens L12, in the first lens group G1 to the leading lens surface, i.e., the surface of the lens L21, in the second lens group 2G.

In FIGS. 1 through 5, the symbol "I" denotes an image surface, and the symbol "F1" denotes an optical component as one of various types of filters, such as an optical low-pass filter or an ultraviolet cut filter. Further, the symbol "F2" denotes another optical component as a cover glass (seal glass) of an image sensor, such as a complementary metal oxide semiconductor (CMOS) or a charge coupled device (CCD). The symbols "F1" and "F2" are illustrated as a parallel planar plate optically equivalent to the respective optical components.

The meanings of the symbols used in common through the Examples are as follows:
f: the focal length of the entire system;
Fno: F number;
ω: half angle of view (degree);
y: maximum image height;
R: radius of curvature;
D: distance between surfaces (which is referred to also as surface distance);
Nd: refractive index with respect to the d line;
vd: Abbe number;
K: conic constant of an aspherical surface;
A4: 4th order aspherical coefficient;
A6: 6th order aspherical coefficient;
A8: 8th order aspherical coefficient; and
A10: 10th order aspherical coefficient.

In Examples 1 through 3 and 5, an aspherical lens is used. The aspherical lens used in Examples 1 through 3 and 5 is defined by mathematical expression (a) below when the symbol "C" denotes an inverse number of a paraxial radius of curvature, and the symbol "H" denotes a height from the optical axis to a lens surface.

[Mathematical Expression]

$$X = CH^2 / \{1 + \sqrt{(1-(1+K)C^2H^2)}\} + A4 \cdot H^4 + A6 \cdot H^6 + A8 \cdot H^8 + A10 \cdot H^{10} \quad (a).$$

Example 1

Figure 1:
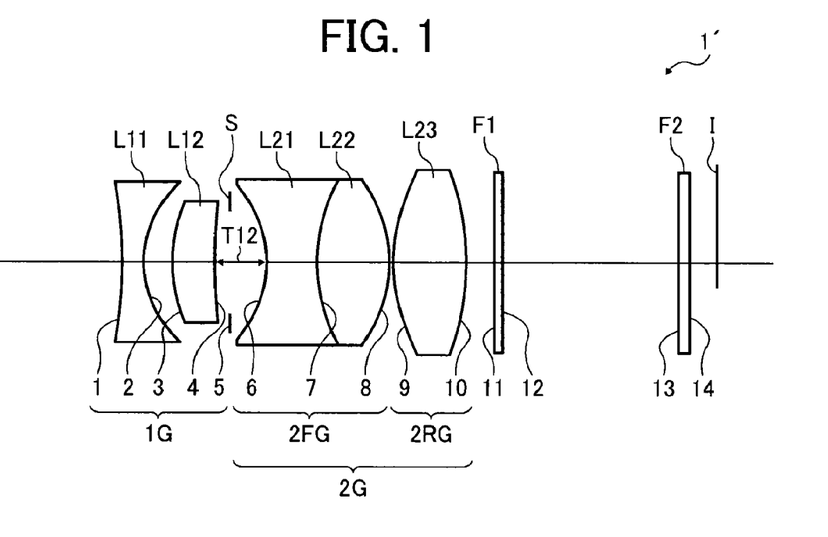
FIG. 1 is a view of an optical arrangement of an imaging optical system according to Example 1 of the present disclosure.

Numerical Examples are given of the imaging optical system according to Example 1 illustrated in FIG. 1. Table 1 below represents optical characteristics of each optical component. In Table 1, the column of "Type of Glass" represents brands of optical glasses manufactured by OHARA INC. or HOYA CORPORATION. In the column of the symbol "R" representing radii of curvature, the symbol "∞" represents a planar surface. The symbol "*" is given to the surface number of the aspherical surface. The same applies to the other Examples. Table 2 below represents conic constant and aspherical coefficients, and Table 3 below represents numerical values of conditional formulas.

TABLE 1 f = 5.53, Fno = 1.57, ω = 34.7

| Surface Number | R | D | Nd | vd | Type of Glass |
|---|---|---|---|---|---|
| 1 | −20.000 | 0.80 | 1.51633 | 64.14 | S-BSL7 (OHARA) |
| 2 | 4.826 | 1.02 | | | |
| 3 | 7.234 | 1.51 | 1.92286 | 18.90 | S-NPH2 (OHARA) |
| 4 | 30.000 | 0.97 | | | |
| 5 | Aperture Stop | 0.93 | | | |
| 6 | −5.210 | 1.80 | 1.84666 | 23.78 | S-TIH53 (OHARA) |
| 7 | 7.902 | 2.58 | 1.71700 | 47.93 | S-LAM3 (OHARA) |
| 8 | −6.369 | 0.15 | | | |
| 9* | 7.776 | 2.67 | 1.61881 | 63.85 | M-PCD4 (HOYA) |
| 10 | −12.064 | 1.00 | | | |
| 11 | ∞ | 0.30 | 1.54437 | 70.71 | Various Types of Filters |
| 12 | ∞ | 6.35 | | | |
| 13 | ∞ | 0.40 | 1.50680 | 46.07 | Various Types of Filters |
| 14 | ∞ | BF | | | |

TABLE 2

| Aspherical Surface | 9th Surface |
|---|---|
| K | −0.10208 |
| A4 | −5.16075E−04 |
| A6 | −1.69452E−06 |
| A8 | 3.12012E−08 |
| A10 | −1.87456E−09 |

TABLE 3

| Conditional Formulas | Numerical Values |
|---|---|
| (1) | \|f2F/f\| = 8.86 |
| (2) | \|f2F1/f\| = 0.63 |
| (3) | f2/f = 1.13 |
| (4) | T12/f = 0.34 |
| (5) | f/AL = 0.26 |

Figure 6:
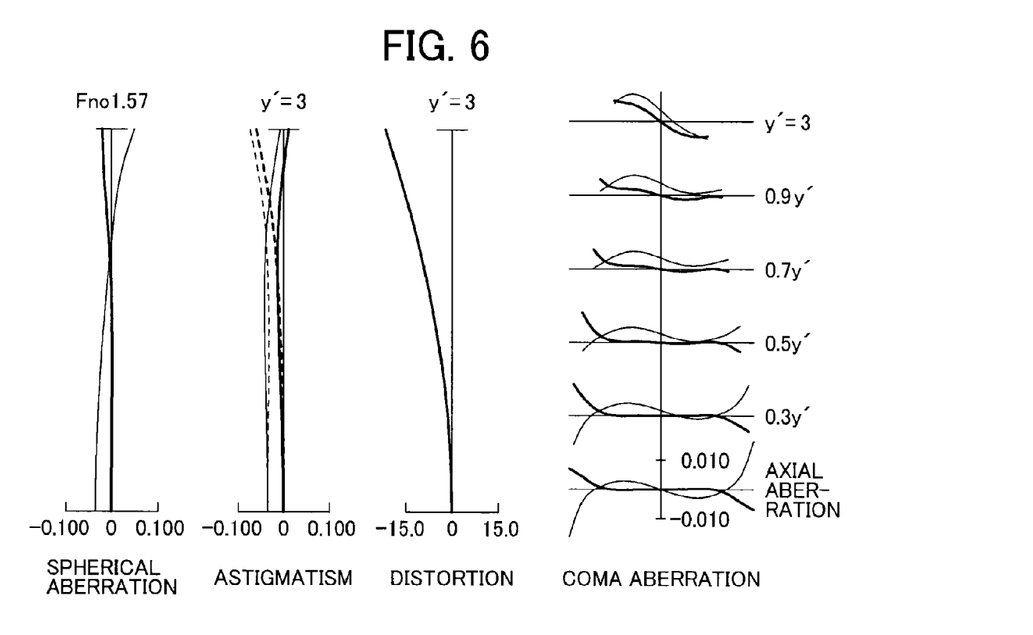
FIG. 6 is a collection of aberration curves of an imaging optical system focused on an object at infinity according to Example 1 of the present disclosure (a thick line indicates aberration with respect to the d line and a thin line indicates aberration with respect to the g line. In the aberration curves of astigmatism, a solid line indicates the sagittal aberration, and a broken line indicates the meridional aberration)

FIG. 6 is a collection of aberration curves of spherical aberration, astigmatism, distortion, and coma aberration in the imaging optical system 1' focused on the object at infinity according to Example 1 of the present disclosure. In the respective aberration curves, a thick line indicates aberrations with respect to the d line, and a thin line indicates aberrations with respect to the g line. In the aberration curves of astigmatism, a solid line indicates the sagittal aberration, and a broken line indicates the meridional aberration. The same applies to the other aberration curves according to the other Examples.

Example 2

Figure 2:
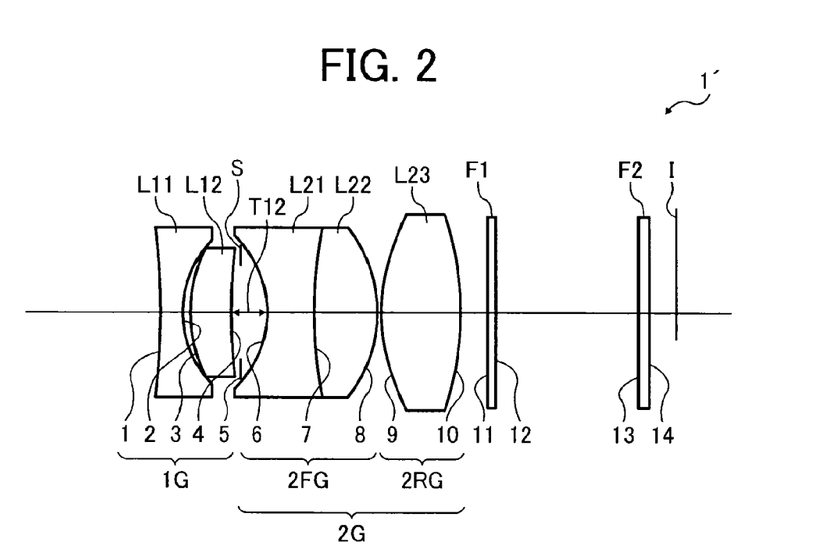
FIG. 2 is a view of an optical arrangement of an imaging optical system according to Example 2 of the present disclosure.
Figure 7:
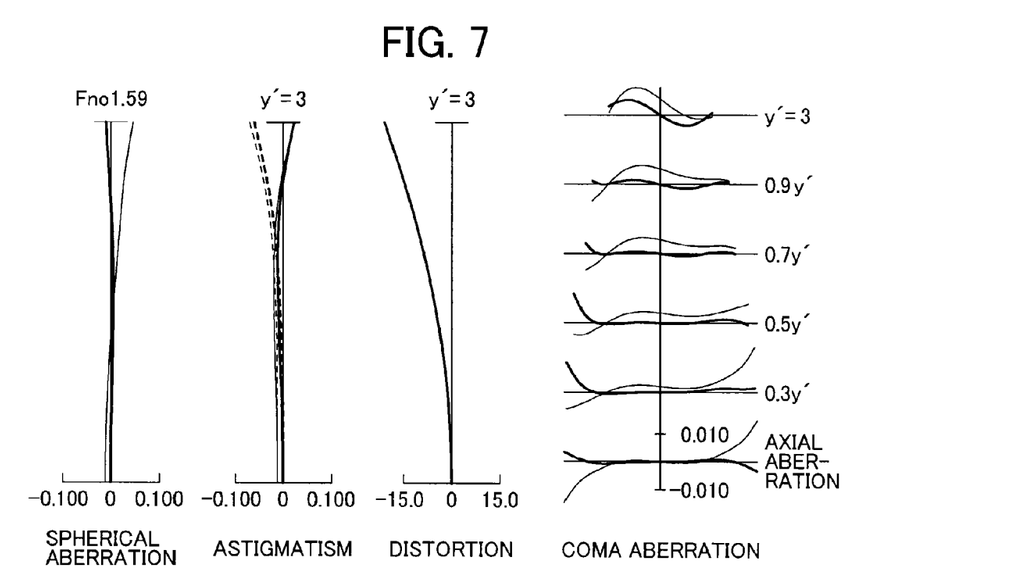
FIG. 7 is a collection of aberration curves of an imaging optical system focused on the object at infinity according to Example 2 of the present disclosure.

Numerical Examples are given of the imaging optical system according to Example 2 illustrated in FIG. 2. Tables 4 through 6 below represent the optical characteristics of each optical component, conic constant and aspherical coefficients, and numerical values of conditional formulas, respectively. FIG. 7 is a collection of aberration curves of spherical aberration, astigmatism, distortion, and coma aberration in the imaging optical system according to Example 2 of the present disclosure.

TABLE 4

$f = 5.52$, $Fno = 1.59$, $\omega = 34.6$

| Surface Number | R | D | Nd | vd | Type of Glass |
|---|---|---|---|---|---|
| 1 | −29.642 | 0.80 | 1.51633 | 64.14 | S-BSL7 (OHARA) |
| 2 | 4.197 | 0.29 | | | |
| 3 | 5.970 | 1.49 | 1.92286 | 18.90 | S-NPH2 (OHARA) |
| 4 | 22.816 | 0.17 | | | |
| 5 | Aperture Stop | 1.18 | | | |
| 6 | −4.278 | 1.71 | 1.89286 | 20.36 | S-NPH4 (OHARA) |
| 7 | 17.795 | 2.30 | 1.80400 | 46.58 | S-LAH65V (OHARA) |
| 8 | −5.697 | 0.15 | | | |
| 9* | 7.285 | 2.95 | 1.61881 | 63.85 | M-PCD4 (HOYA) |
| 10 | −12.620 | 1.00 | | | |
| 11 | ∞ | 0.30 | 1.54437 | 70.71 | Various Types of Filters |
| 12 | ∞ | 5.25 | | | |
| 13 | ∞ | 0.40 | 1.50680 | 46.07 | Various Types of Filters |
| 14 | ∞ | BF | | | |

TABLE 5

| Apherical Surface | $9^{th}$ Surface |
|---|---|
| K | −0.06384 |
| A4 | −6.02437E−04 |
| A6 | −2.72886E−06 |
| A8 | −1.94106E−08 |
| A10 | −1.02174E−09 |

TABLE 6

| Conditional Formulas | Numerical Values |
|---|---|
| (1) | $|f2F/f| = 21.87$ |
| (2) | $|f2F1/f| = 0.68$ |
| (3) | $f2/f = 1.02$ |
| (4) | $T12/f = 0.24$ |
| (5) | $f/AL = 0.29$ |

Example 3

Figure 3:
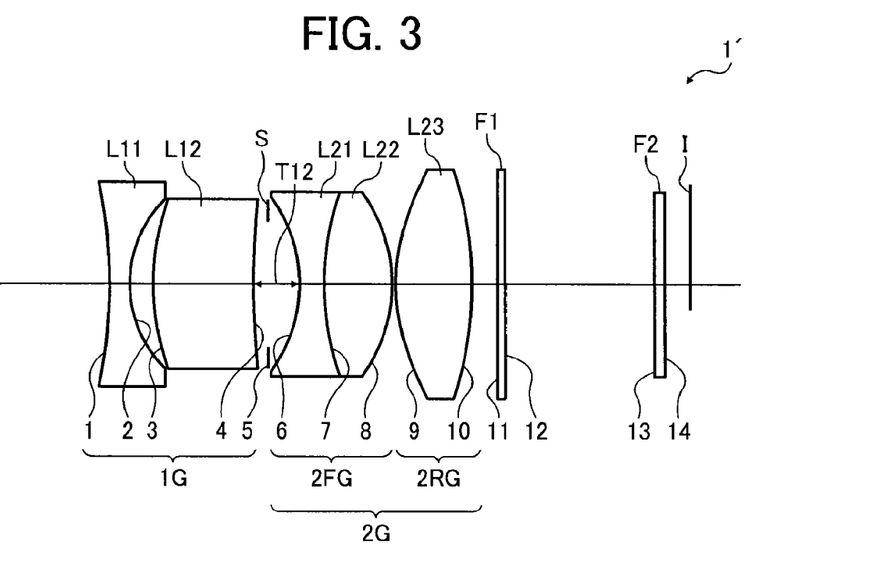
FIG. 3 is a view of an optical arrangement of an imaging optical system according to Example 3 of the present disclosure.
Figure 4:
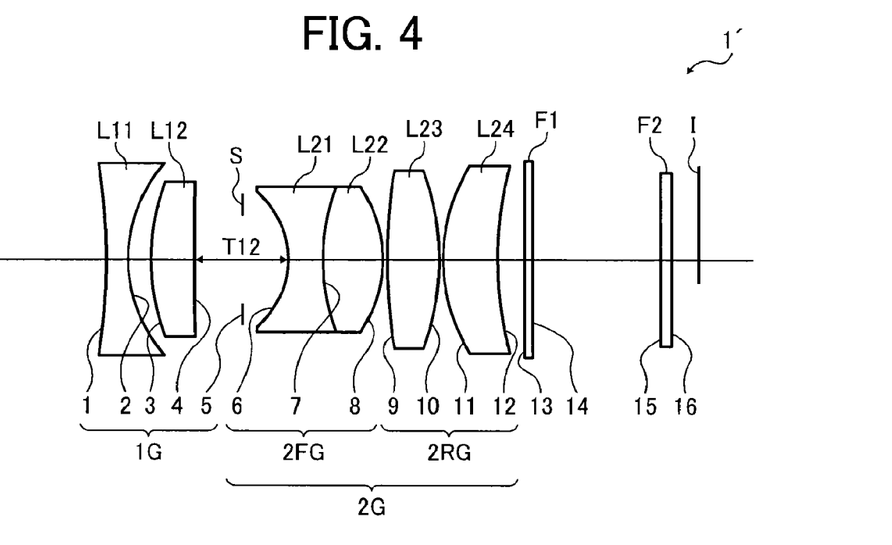
FIG. 4 is a view of an optical arrangement of an imaging optical system according to Example 4 of the present disclosure.
Figure 8:
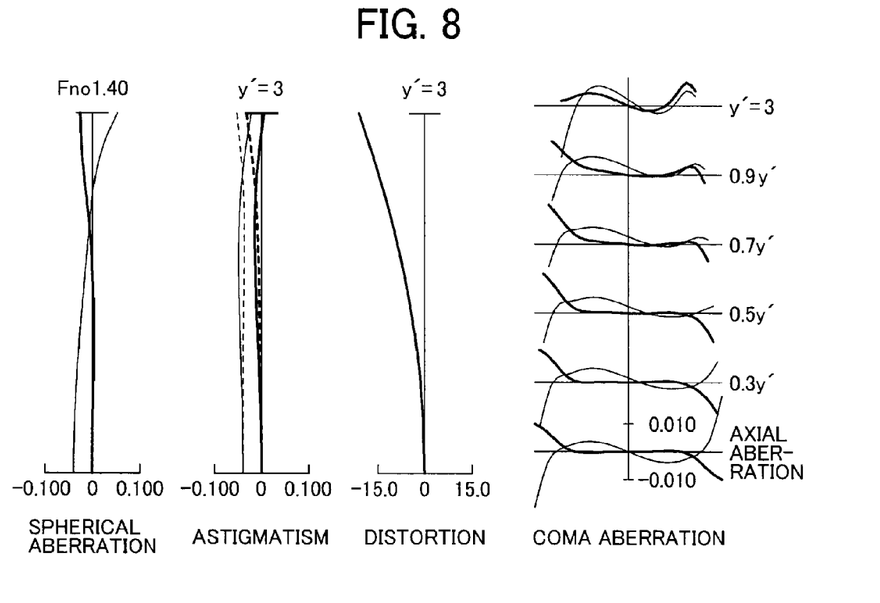
FIG. 8 is a collection of aberration curves of an imaging optical system focused on the object at infinity according to Example 3 of the present disclosure.

Numerical Examples are given of the imaging optical system according to Example 3 illustrated in FIG. 3. Tables 7 through 9 below represent the optical characteristics of each optical component, conic constant and aspherical coefficients, and numerical values of conditional formulas, respectively. FIG. 8 is a collection of aberration curves of spherical aberration, astigmatism, distortion, and coma aberration in the imaging optical system according to Example 3 of the present disclosure.

TABLE 7

$f = 5.50$, $Fno = 1.40$, $\omega = 34.7$

| Surface Number | R | D | Nd | vd | Type of Glass |
|---|---|---|---|---|---|
| 1 | −21.01100 | 0.80 | 1.49700 | 81.54 | S-FPL51 (OHARA) |
| 2 | 4.73700 | 0.96 | | | |

TABLE 7-continued $f = 5.50$, $Fno = 1.40$, $\omega = 34.7$

| Surface Number | R | D | Nd | vd | Type of Glass |
|---|---|---|---|---|---|
| 3* | 9.66700 | 3.99 | 1.92286 | 20.88 | M-FDS1 (HOYA) |
| 4 | 34.99700 | 1.13 | | | |
| 5 | Aperture Stop | 0.67 | | | |
| 6 | −6.07000 | 0.98 | 1.84666 | 23.78 | S-TIH53 (OHARA) |
| 7 | 11.29400 | 2.68 | 1.80400 | 46.58 | S-LAH65V (OHARA) |
| 8 | −6.42700 | 0.15 | | | |
| 9* | 7.93300 | 3.00 | 1.61881 | 63.85 | M-PCD4 (HOYA) |
| 10 | −15.23600 | 1.00 | | | |
| 11 | ∞ | 0.30 | 1.54437 | 70.71 | Various Types of Filters |
| 12 | ∞ | 5.96 | | | |
| 13 | ∞ | 0.40 | 1.50680 | 46.07 | Various Types of Filters |
| 14 | ∞ | BF | | | |

TABLE 8

| Aspherical Surface | 3rd Surface | $9^{th}$ Surface |
|---|---|---|
| K | −0.45091 | 0.08660 |
| A4 | −2.89980E−05 | −4.57309E−04 |
| A6 | −1.30023E−05 | −8.46306E−07 |
| A8 | 1.75267E−06 | −1.39586E−07 |
| A10 | −1.47667E−07 | 2.17038E−09 |

TABLE 9

| Conditional Formulas | Numerical Values |
|---|---|
| (1) | $|f2F/f| = 10.39$ |
| (2) | $|f2F1/f| = 0.83$ |
| (3) | $f2/f = 1.13$ |
| (4) | $T12/f = 0.33$ |
| (5) | $f/AL = 0.24$ |

Example 4

Figure 9:
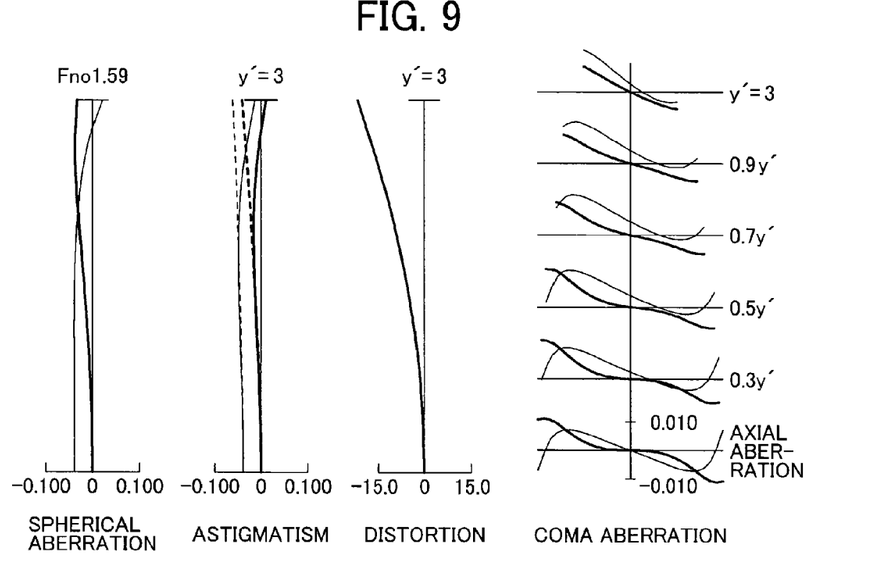
FIG. 9 is a collection of aberration curves of an imaging optical system focused on the object at infinity according to Example 4 of the present disclosure.

Numerical Examples are given of the imaging optical system according to Example 4 illustrated in FIG. 4. Tables 10 and 11 below represent optical characteristics of each optical component, and numerical values of conditional formulas, respectively. FIG. 9 is a collection of aberration curves of spherical aberration, astigmatism, distortion, and coma aberration in the imaging optical system according to Example 4 of the present disclosure.

TABLE 10

$f = 5.54$, $Fno = 1.59$, $\omega = 34.7$

| Surface Number | R | D | Nd | vd | Type of Glass |
|---|---|---|---|---|---|
| 1 | −31.09900 | 0.80 | 1.51633 | 64.14 | S-BSL7 (OHARA) |
| 2 | 6.70900 | 0.89 | | | |
| 3 | 10.60300 | 1.61 | 1.92286 | 18.90 | S-NPH2 (OHARA) |
| 4 | 200.00000 | 2.58 | | | |
| 5 | Aperture Stop | 0.91 | | | |
| 6 | −4.20700 | 1.28 | 1.84666 | 23.78 | S-TIH53(OHARA) |
| 7 | 9.95300 | 2.24 | 1.74100 | 52.64 | S-LAH61(OHARA) |
| 8 | −6.14100 | 0.15 | | | |
| 9 | 27.96600 | 1.92 | 1.77250 | 49.60 | S-LAH66(OHARA) |
| 10 | −12.48500 | 0.15 | | | |
| 11 | 8.63100 | 2.00 | 1.80400 | 46.58 | S-LAH65V(OHARA) |

TABLE 10-continued f = 5.54, Fno = 1.59, ω = 34.7

| Surface Number | R | D | Nd | vd | Type of Glass |
|---|---|---|---|---|---|
| 12 | 18.32100 | 1.00 | | | |
| 13 | ∞ | 0.30 | 1.54437 | 70.71 | Various Types of Filters |
| 14 | ∞ | 4.80 | | | |
| 15 | ∞ | 0.40 | 1.50680 | 46.07 | Various Types of Filters |
| 16 | ∞ | BF | | | |

TABLE 11

| Conditional Formulas | Numerical Values |
|---|---|
| (1) | $\|f2F/f\|$ = 4.23 |
| (2) | $\|f2F1/f\|$ = 0.61 |
| (3) | $f2/f$ = 1.10 |
| (4) | $T12/f$ = 0.63 |
| (5) | $f/AL$ = 0.25 |

Example 5

Figure 5:
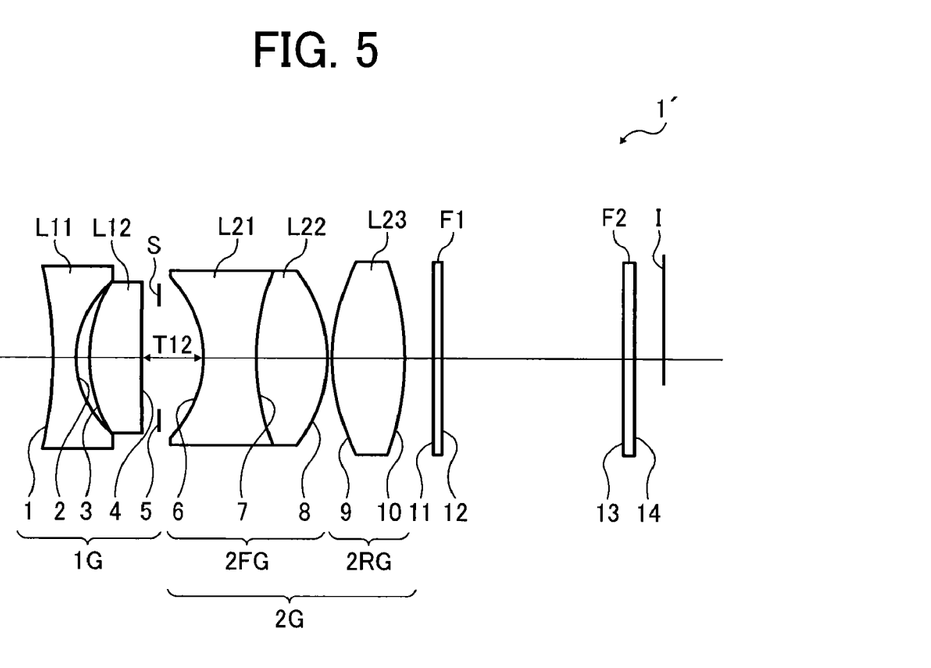
FIG. 5 is a view of an optical arrangement of an imaging optical system according to Example 5 of the present disclosure.
Figure 10:
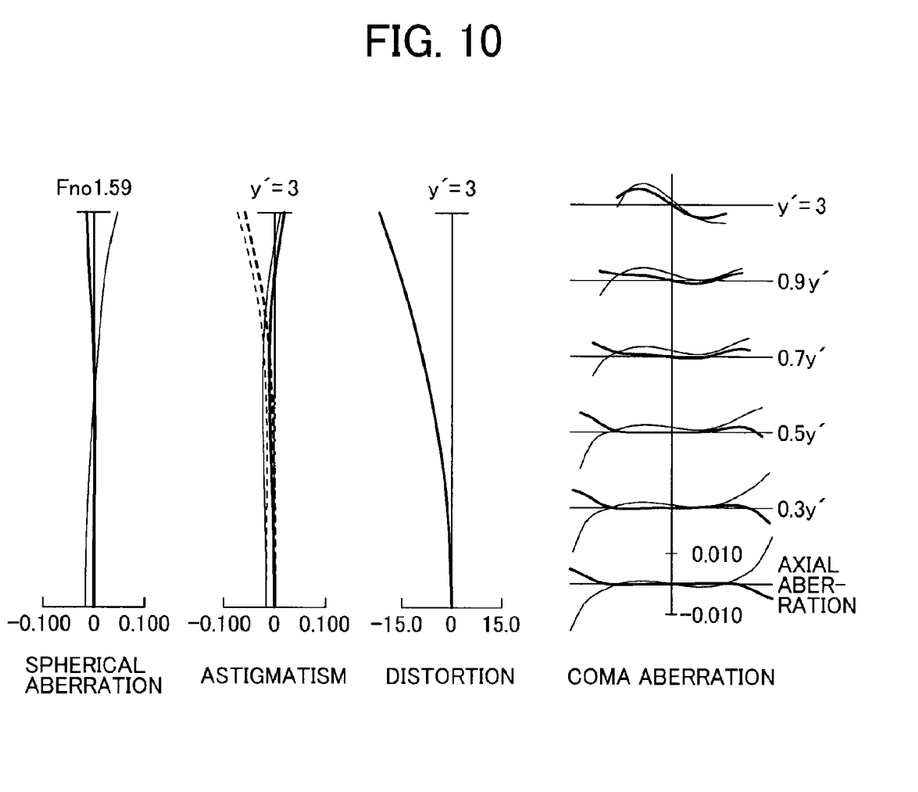
FIG. 10 is a collection of aberration curves of an imaging optical system focused on the object at infinity according to Example 5 of the present disclosure.

Numerical Examples are given of the imaging optical system 1' according to Example 5 illustrated in FIG. 5. Tables 12 through 14 below represent the optical characteristics of each optical component, conic constant and aspherical coefficients, and numerical values of conditional formulas, respectively. FIG. 10 is a collection of aberration curves of spherical aberration, astigmatism, distortion, and coma aberration in the imaging optical system 1' according to Example 5 of the present disclosure.

TABLE 12 f = 5.53, Fno = 1.59, ω = 34.7

| Surface Number | R | D | Nd | vd | Type of Glass |
|---|---|---|---|---|---|
| 1 | −17.19500 | 0.80 | 1.51633 | 64.14 | S-BSL7 (OHARA) |
| 2 | 4.11400 | 0.45 | | | |
| 3* | 6.34500 | 1.77 | 1.82115 | 24.06 | M-FDS910 (HOYA) |
| 4 | 180.00000 | 1.54 | | | |
| 5 | Aperture Stop | 0.62 | | | |
| 6 | −4.70600 | 1.80 | 1.84666 | 23.78 | S-TIH53(OHARA) |
| 7 | 9.93800 | 2.44 | 1.71700 | 47.93 | S-LAM3 (OHARA) |
| 8 | −5.95000 | 0.15 | | | |
| 9* | 7.68900 | 2.49 | 1.61881 | 63.85 | M-PCD4(HOYA) |
| 10 | −12.07400 | 1.00 | | | |
| 11 | ∞ | 0.30 | 1.54437 | 70.71 | Various Types of Filters |
| 12 | ∞ | 6.25 | | | |
| 13 | ∞ | 0.40 | 1.50680 | 46.07 | Various Types of Filters |
| 14 | ∞ | BF | | | |

TABLE 13

| Aspherical Surface | 3rd Surface | 9th Surface |
|---|---|---|
| K | 0.21624 | −0.12273 |
| A4 | 1.93498E−04 | −5.27254E−04 |
| A6 | 1.74635E−05 | −2.16755E−06 |
| A8 | 1.08075E−06 | 4.92547E−08 |
| A10 | | −2.10189E−09 |

TABLE 14

| Conditional Formulas | Numerical Values |
|---|---|
| (1) | $\|f2F/f\|$ = 8.97 |
| (2) | $\|f2F1/f\|$ = 0.65 |
| (3) | $f2/f$ = 1.10 |
| (4) | $T12/f$ = 0.39 |
| (5) | $f/AL$ = 0.26 |

As described above, the numerical values of conditional formulas in the imaging optical system 1' according to Examples 1 through 5 fall within the ranges of Conditional formulas (1), (2), (3), (4), and (5). More preferably, the numerical values satisfy conditional formulas (1A), (2A), (3A), and (4A). According to the numerical values and the aberration curves of FIGS. 6 through 10, the imaging optical system 1' according to Examples 1 through 5 of the present disclosure has a high performance with aberrations sufficiently corrected. Further, the imaging optical system 1' according to Examples 1 through 5 is reduced in size with less number of lenses, maintaining a successful imaging performance, irrespective of a wide angle of view with a full angle of approximately 69° and a large diameter with an F number of less than or equal to approximately 1.6.

Example 6

Figure 11A:
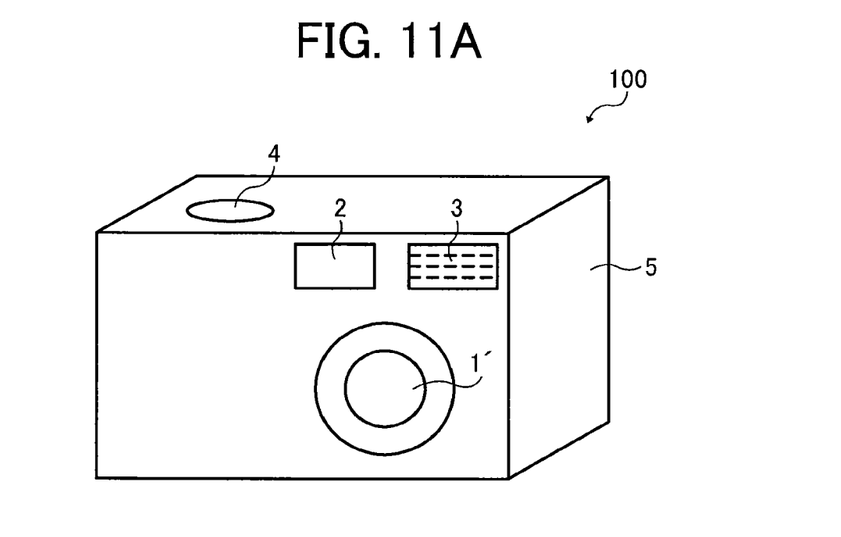
FIG. 11A is a schematic perspective view of a front side of a camera device according to Example 6 of the present disclosure.
Figure 11B:
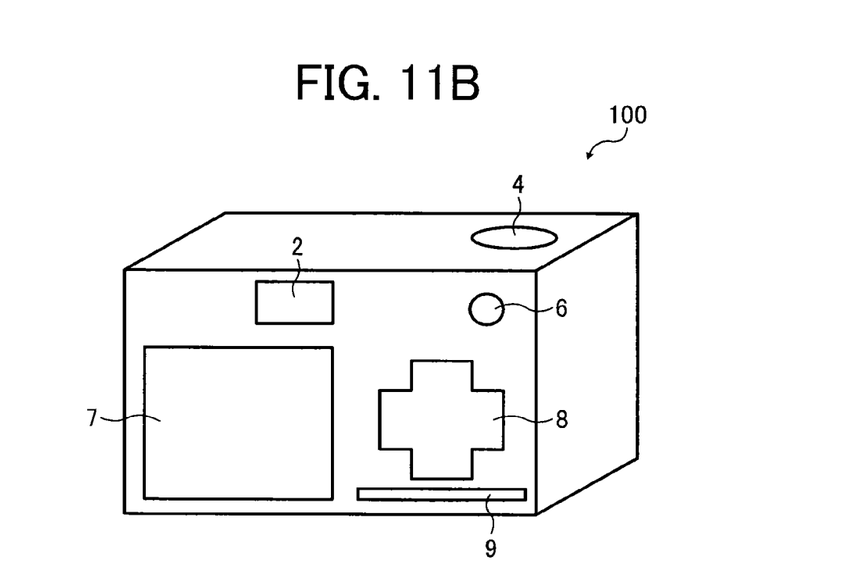
FIG. 11B is a schematic perspective view of a back side of the camera device according to Example 6 of the present disclosure.
Figure 12:
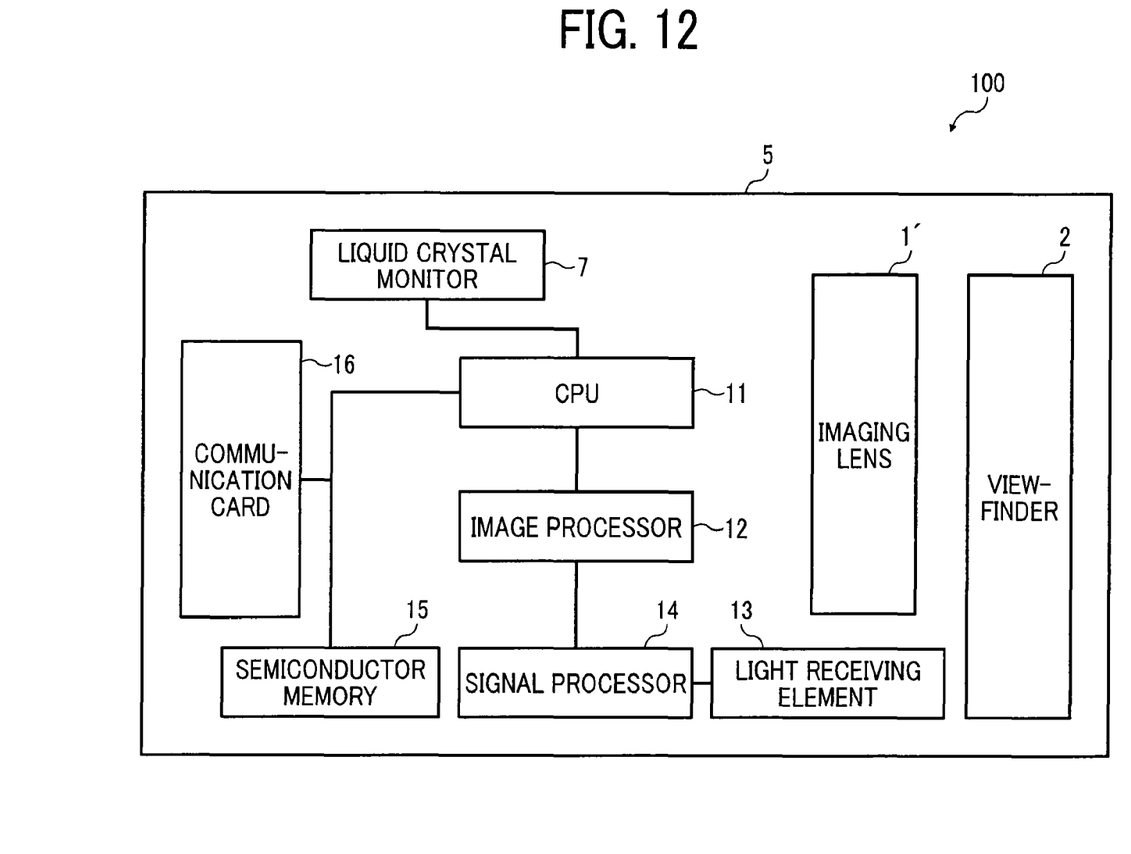
FIG. 12 is a block diagram of another example of the camera device of FIG. 11.

Next, a description is given of a camera device according to an embodiment that includes the imaging optical system 1' according to Examples 1 through 5 according to the present disclosure, as an imaging optical system or a moving image shooting optical system, referring to FIGS. 11 and 12. In Example 6, a description is given of a digital camera as an example of the camera device.

It is to be noted that the camera device of the present disclosure is not limited to a digital camera. The imaging optical system 1' according to Examples 1 through 5 is applicable in a camera device dedicated to imaging, such as a video camera mainly for shooting a moving image and a film camera that utilizes silver film.

In addition to such camera devices, an imaging function corresponding to a digital camera is frequently incorporated into various types of information apparatus (portable information terminal apparatus), such as a cellar phone, a portable information terminal apparatus, which is also referred to as a personal data assistant (PDA), and a portable terminal device, such as a smart phone and a tablet including the functions of the cellar phone and the portable information terminal apparatus. Such information apparatus includes substantially the same functions and configurations as those of digital cameras, irrespective of differences in outer appearance. The imaging optical system 1' according to Examples 1 through 5 as described above may be applied to such information apparatus.

As illustrated in FIG. 11A and FIG. 11B, the digital camera 100 according to the present Examples includes a housing (a camera body) 5, and an imaging lens (imaging optical system) 1', an optical viewfinder 2, a strobe (flashlight) 3, a shutter button 4, a power switch 6, a liquid crystal monitor 7, an operation key 8, and a memory card slot 9 on the housing 5. As illustrated in FIG. 12, the digital camera 100 further includes a central processing unit (CPU) 11, an image processor 12, a signal processor 14, a semiconductor memory 15, and a communication card 16 within the housing 5.

The digital camera 100 includes the imaging lens 1' as an imaging optical system and a light receiving element 13 as an image sensor, such as a complementary metal oxide semiconductor (CMOS) or a charge coupled device (CCD) to allow the light receiving element 13 to read out an optical image of a subject formed by the imaging lens 1'. As the imaging lens 1', the imaging optical system according to Examples 1 through 5 described above may be used.

The CPU 11 controls the signal processor 14 to convert the output of the light receiving element 13 into digital image data. The digital image data processed by the signal processor 14 is then subjected to a predetermined image processing by the image processor 12 under control of the CPU, and recorded in the semiconductor memory 15, such as a nonvolatile memory. In this case, the semiconductor memory 15 may be a memory card installed in the memory card slot 9 or an on-board semiconductor memory incorporated in the body of the digital camera.

The liquid crystal monitor 7 displays an image photographed as well as image recorded in the semiconductor memory 15. The images recorded in the semiconductor memory 15 may be sent to the outside via the communication card 16 installed into a communication card slot, which may serves as the memory card slot 9 as well.

In the imaging lens 1', an object face is covered by a lens barrier while the camera including the imaging lens 1' is carried, and a user's operating the power switch 6 to turn on the power opens the lens barrier to expose the object face to outside.

To display the image recorded in the semiconductor memory 15 onto the liquid crystal monitor 7, or send the image to the outside via the communication card 16, the operation key 8 is operated in accordance with a predetermined procedure. The semiconductor memory 15 and the communication card 16 are installed in a dedicated or general-purpose slot, such as a memory card slot 9 and a communication card slot.

Applying the imaging lens 1' of the imaging optical system according to Examples 1 through 5 of the present disclosure to the digital camera (camera device) according to Example 6 achieves a compact imaging optical system having a wide angle of view with a full angle of view of approximately 69° and a large diameter having an F number of less than or equal to approximately 1.6, having a successful performance to maintain a successful image forming performance.

A description is given of the imaging optical system, and the camera device, and the portable information terminal apparatus according to the embodiments and Examples of the present disclosure. The present disclosure is not limited to the configurations according to the embodiments and Examples described above. Modification and addition of design are permissible as far as such modification and addition of design do not go beyond the scope of the gist of the present disclosure. The number, position, and shape of the constituent elements are not limited to the Examples, and the number, position, and shape suitable for implementing the present disclosure are available. In the embodiment and Examples described above, an example is taken of the camera device, such as a vehicle-mounted camera, a vehicle-mounted stereoscopic camera, vehicle-mounted sensing camera, a digital camera, and a video camera, the imaging optical system used for a silver-salt camera, and the portable information terminal apparatus. However, the present disclosure of this application is not limited to the examples described above. For example, the present disclosure is available for an optical system used for the optical sensor or a projection optical system for use in an image projection device.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. An imaging optical system comprising, in order from an object side:
   a first lens group;
   an aperture stop; and
   a second lens group,
   the first lens group including, in order from the object side:
      a negative lens of a biconcave shape; and
      a positive meniscus lens with a convex surface facing the object side,
   the second lens group including, in order from the object side:
      a second-front lens group that includes a cemented lens; and
      a second-rear lens group having a positive refractive power as a whole, wherein
   the cemented lens includes a negative lens on an object side of a positive lens, and
   the negative lens has a concave surface facing the object side.

2. The imaging optical system according to claim 1, wherein the positive lens within the second-front lens group has a biconvex shape.

3. The imaging optical system according to claim 1, wherein conditional formula (1) below is satisfied:

$$3.00<|f2F/f|<30.00, \tag{1}$$

where,
f is a focal length of the entire imaging optical system, and
f2F is a focal length of the second-front lens group.

4. The imaging optical system according to claim 1, wherein conditional formula (2) below is satisfied:

$$0.30<|f2F1/f|<2.00, \tag{2}$$

where,
f is the focal length of the entire imaging optical system, and
f2F1 is a focal length of the negative lens disposed on the most-object side within the second-front lens group.

5. The imaging optical system according to claim 1, wherein conditional formula (3) below is satisfied:

$$0.50<f2/f<4.00, \tag{3}$$

where,
f is the focal length of the entire imaging optical system, and
f2 is a focal length of the second lens group.

6. The imaging optical system according to claim 1, wherein conditional formula (4) below is satisfied:

$$0.10<T12/f<1.00, \tag{4}$$

where, f is the focal length of the entire imaging optical system, and

T12 is a distance along an optical axis from a last lens surface within the first lens group to a leading lens surface within the second lens group.

7. The imaging optical system according to claim 1, wherein conditional formula (5) below is satisfied:

$$0.15 < f/AL < 0.50, \tag{5}$$

where, f is the focal length of the entire imaging optical system focused on an object at infinity, and AL is a distance along an optical axis from a first surface of the first lens group to an image surface.

8. A camera device comprising the imaging optical system according to claim 1.

9. The camera device according to claim 8, further comprising a signal processor to convert a photographed image into digital image data.

10. A portable information terminal apparatus comprising the imaging optical system according to claim 1.

11. The image optical system according to claim 1, wherein a lens surface closest to the object side of the second lens group is concave and faces the object side.

* * * * *